March 21, 1967  F. P. RODWICK  3,310,692
MOTOR HOUSING ASSEMBLY USING STRAIN RELIEF AS FASTENER
Filed Oct. 26, 1964
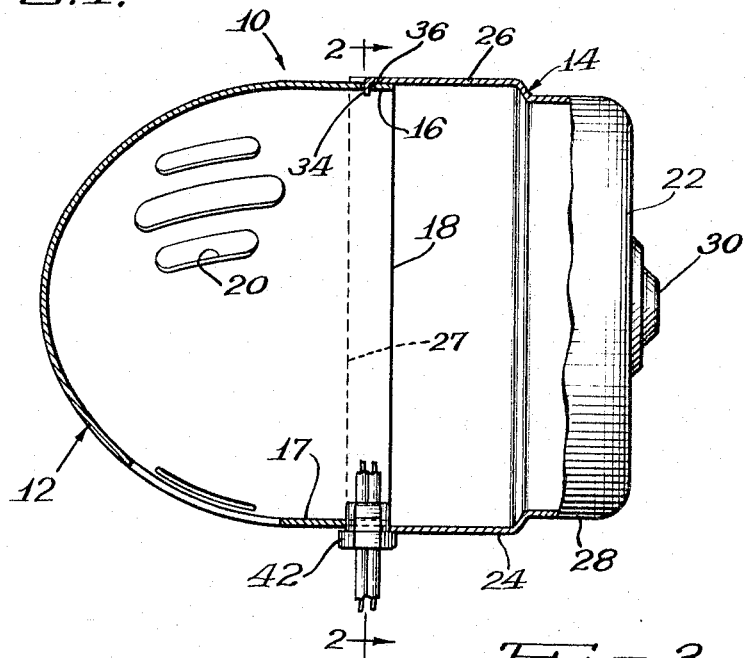
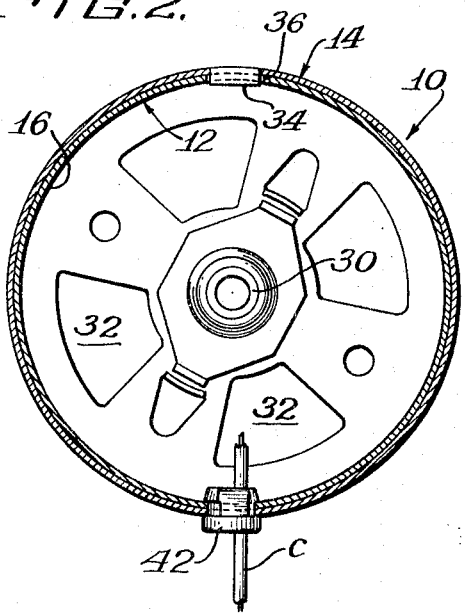
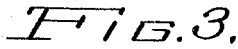
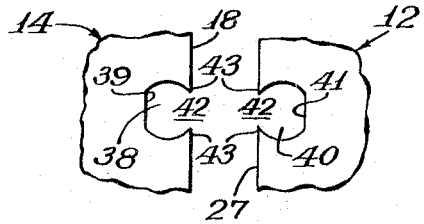
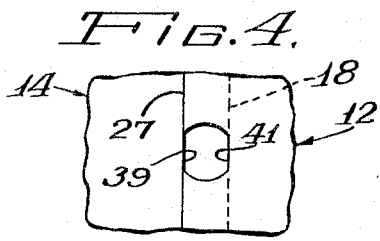
Inventor:
Frank P. Rodwick
By Bair, Freeman & Molinare
Attys.

United States Patent Office 3,310,692
Patented Mar. 21, 1967

3,310,692
MOTOR HOUSING ASSEMBLY USING STRAIN RELIEF AS FASTENER
Frank P. Rodwick, St. Louis, Mo., assignor to Knapp-Monarch Company, St. Louis, Mo., a corporation of Delaware
Filed Oct. 26, 1964, Ser. No. 406,476
3 Claims. (Cl. 310—71)

This invention relates to an improved motor housing having highly economical and simplified means for securing the front and rear portions of a motor housing assembly together.

On small, lightweight motors used for operating small home appliances, such as would be used for small desk fans, the motor is usually enclosed within sheet metal front and rear housing members which are secured together. The standard means for securing the housing members together is by passing two or more sheet metal screws through both the housings when they are in partially telescoping relationship. Another method for fastening the front and rear housings together is by the use of cooperating lug and slot means provided on both housing parts, together with at least one sheet metal screw circumferentially spaced from the lug-slot means. In these prior constructions, the electric cord which passes into the housing and is connected to the motor usually enters the motor housing through an insulating grommet or the like which is usually inserted in an opening provided in one of the housing members. Upon the insertion of the cord through the grommet in the housing, there is often a problem of the cord moving or turning within the grommet. This is highly undesirable since the cord usually has plastic insulation, and when it is moved to a position where it contacts hot motor parts or where it contacts moving motor parts, the insulation may be damaged by heat or abrasions, and this may ultimately result in a shorting of the motor.

Although these prior constructions are relatively inexpensive, nevertheless in the small appliance industry, it is very important to reduce all costs wherever possible, whether in parts savings or in labor savings. As an example of undesired labor costs involved in the described prior constructions, since the cord must pass through an opening provided in one of the motor housing parts, the motor assembly must move along the motor assembly line with the housing part trailing along. This slows down an otherwise speedy production line and may cause reworking of the motor housing as a result of scratching or other finish damage to the housing part which moves along with the motor assembly.

It is, therefore, an important object of this invention to provide an improved housing for small appliance motors wherein the disadvantages of prior art constructions are substantially avoided.

It is also an object of this invention to provide an improved motor housing for small appliance motors wherein the front and rear housing members are secured together by a construction which is highly economical from the standpoint of both parts savings and labor savings, effected through the use of the grommet for the motor-energizing wire as one of the connectors for the telescoping parts of the sheet metal motor housing.

It is a further object of this invention to provide an improved and less costly housing for small appliance motors wherein the front and rear housing members are secured together by an improved construction which avoids the use of screws and avoids the necessity of moving one of the housing members along with the motor during its assembly, thereby significantly speeding assembly operations and also substantially avoiding the necessity of reworking of the motor housing as a result of finish damage to a painted motor housing.

Further purposes and objects of this invention will appear as the specification proceeds.

A particular embodiment of the present invention is illustrated in the accompanying drawings wherein:

FIGURE 1 is a partially sectioned, side elevational view of my improved motor housing construction;

FIGURE 2 is a sectional view taken along the line 2—2 of FIGURE 1;

FIGURE 3 is a fragmentary detail view showing the strain relief apertures in each of the telescoping motor housing parts, before they are aligned for receiving a strain relief; and FIGURE 4 is a view similar to FIGURE 3, except that the apertures are shown in the aligned condition.

The motor housing assembly 10 includes a rear housing member 12 and a front housing member 14 which are in telescoping or overlapping relationship at 16. The motor housing 10 is particularly useful for enclosing small motors (not shown) used for operating small household appliances; the housing 10 shown in the drawings is particularly useful for enclosing motors for small desk fans having blades ranging in diameter from about 8 inches to 14 inches.

The rear portion of the rear housing member or body 12 is generally hemispherical in shape while the forward portion 17 thereof is substantially cylindrical in shape and terminates with a forward or leading edge 18. The rear housing member 12 includes a plurality of openings, as 20, for ventilation of the motor; other openings are also provided as for oiling the motor, mounting the motor, etc. The front housing member 14 includes a substantially planar or flat front wall 22 and a stepped, substantially cylindrical side wall 24 which terminates in a rear or trailing edge 27. The rear portion 26 of the cylindrical side wall 24 has an increased diameter over the forward portion 28 of the side wall 24. The inner diameter of the cylindrical rear portion 26 of the housing 14 is of slightly greater diameter than the outer diameter of the cylindrical forward portion 17 of the rear housing member 12 so that the cylindrical portion 17 telescopes a short distance, at 16, within the cylindrical portion 26 of the front housing member 14. The front wall 22 of the front housing member 14 includes a bearing member 30 which rotationally supports a motor shaft (not shown). Various openings, as 32, are provided in the front wall 22 in order to provide for air ventilation of the motor. Both the front and rear housing members 12 and 14 are constructed of cold-rolled steel and are formed to the desired shape by drawing operations.

The important feature of the applicant's construction 10 is in the securing together of the housing members 12 and 14. At the upper portion of the housing, as seen in FIGURE 1, the cylindrical wall 26 of the front housing 14 includes a downturned finger or lug 34 which is inserted into a slotted opening 36 provided in the cylindrical portion 17 of the rear housing 12. The lug 34 engages the slot 36, thereby cooperating to properly locate or align the front housing member 14 with the rear housing member 12. Circumferentially spaced from the lug and slot connection 34–36 are openings 38 and 40, which are desirably located 180° away from connection 34–36. Both the openings 38 and 40 have substantially the same shape with flat or straight inner edges respectively 39 and 41, preferably directly opposite the entrance to the openings. The openings are dimensioned so as to securely receive a strain relief grommet member 42 therein. The preferred location of the straight inner edges avoids developing casing separating forces by the strain relief grommet. The strain relief 42 may be any of the conventional strain reliefs available from various electrical parts manufacturers. The strain relief 42 passes through both openings 38 and 40 when they are in the aligned condition, that is, when the motor housing members 12 and 14 are in overlapping or telescoping relationship. In this position, the strain relief 42 also cooperates with the holes 38 and 40 in order to maintain the housing members 12 and 14 securely together.

Regardless of the particular shape of opening required for receiving a strain relief 42, it is important that both openings 38 and 40 extend through the edges 18 and 27 of the respective housing members 12 and 14 and that the entrance openings 42 at the edges 18 and 27 be restricted in comparison to the dimensions of the main part of the openings 38 or 40. The restricted entrances 42 for the openings 38 and 40 serve a twofold function in permitting the passage of an electrical cord C therethrough prior to the positioning of the motor housing 10 around a motor, and secondly in providing ears 43 which engage the sides of the strain relief and cooperate therewith for securing the housing members 12 and 14 together.

The strain relief member 42 serves the dual function of replacing screw fasteners or the like which are ordinarily required for securing motor housings together, while at the same time it serves its normal function as a strain relief for an electrical cord C for the electric motor (not shown) enclosed within the housing 10. The lug 34 and slot 36 not only provide for proper alignment between the housing members 12 and 14 but also cooperate with the strain relief 42 and openings 38 and 40 for maintaining the parts together. The entrance openings 42 for the cord C make it possible to assemble the motor field, rotor, field windings, and cord connections prior to enclosing the motor within the housing 10. Thus, it is no longer necessary to move a housing member along with the motor during assembly. This speeds up the production line and substantially eliminates reworking of the motor housing which may result from scratching or other finish damage to the painted housing parts 12 or 14. The strain relief 42 also prevents movement of the cord and cooperates with the lug-slot means for preventing rotation between the housing members 12 and 14; this securement of the cord avoids abrasion of the cord which might result from heat or contact with moving motor parts when the cord is moved.

While in the foregoing there has been provided a detailed description of a particular embodiment of the present invention, it is to be understood that all equivalents obvious to those having skill in the art are to be included with the scope of the invention as claimed.

What I claim and desire to secure by Letters Patent is:

1. An improved motor housing comprising a first mating part, a second mating part in telescoping relationship with said first mating part, said mating parts together forming a chamber for receiving a motor, a first aperture in said first mating part, a second aperture in said second mating part, said apertures being substantially co-extensive, each of said apertures having restricted entrances which extend through the outer edges of each of said mating parts, and a strain relief member mounted about an electrical cord, said strain relief passing through both said apertures to thereby maintain said first and second mating parts together.

2. An improved motor housing comprising a first housing member having a substantially cylindrical portion, a second housing member also having a substantially cylindrical portion, said housing members being in telescoping relationship and forming a motor chamber, each of said members having outer edge portions, a first aperture in said first member, a second aperture in said second member and being aligned with said first aperture, each of said members having restricted entrance openings which extend through the outer edge portions of each of said members, ears being formed at said entrance openings, and a strain relief member mounted about a cord which extends into the motor housing, said strain relief member passing through said aligned apertures and cooperating with said ears in order to maintain said first and second members together and to substantially prevent movement therebetween.

3. The housing of claim 2 wherein cooperating means are provided on said first and second housing members for assisting said strain relief and said openings for maintaining said housing members together, said cooperating means being circumferentially spaced from said apertures.

References Cited by the Examiner

UNITED STATES PATENTS

| | | | |
|---|---|---|---|
| 2,355,175 | 8/1944 | Oluing | 230—259 |
| 2,383,379 | 8/1945 | Forss | 310—50 |
| 2,876,369 | 3/1959 | Doerner | 310—50 |
| 2,950,859 | 8/1960 | Kirk | 230—259 |

MILTON O. HIRSHFIELD, *Primary Examiner.*

J. D. MILLER, *Assistant Examiner.*